United States Patent
Wood

(10) Patent No.: US 7,661,626 B2
(45) Date of Patent: Feb. 16, 2010

(54) WINDOW ASSEMBLY RETAINING SYSTEM

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 452 days.

(21) Appl. No.: 11/262,361

(22) Filed: Oct. 28, 2005

(65) Prior Publication Data

US 2007/0095984 A1    May 3, 2007

(51) Int. Cl.
    *B64C 1/14*    (2006.01)
(52) U.S. Cl. .................... 244/129.3; 296/201
(58) Field of Classification Search .......... 244/129.3; 296/201
    See application file for complete search history.

(56) References Cited

U.S. PATENT DOCUMENTS

| | | | |
|---|---|---|---|
| 2,388,786 A | | 11/1945 | Knight et al. |
| 4,541,595 A | * | 9/1985 | Fiala et al. ............. 244/129.3 |
| 4,611,850 A | * | 9/1986 | Fujikawa ................. 296/201 |
| 4,699,335 A | * | 10/1987 | DeOms et al. .......... 244/129.3 |
| 4,793,108 A | * | 12/1988 | Bain et al. .................. 52/208 |
| 5,271,581 A | * | 12/1993 | Irish ........................ 244/129.3 |
| 6,067,761 A | * | 5/2000 | Demeester .................. 52/208 |
| 6,082,674 A | * | 7/2000 | White et al. ............. 244/129.3 |
| 6,168,112 B1 | * | 1/2001 | Mueller et al. ........... 244/129.3 |
| 6,227,491 B1 | * | 5/2001 | Stephan et al. ........... 244/129.3 |
| 6,333,285 B1 | * | 12/2001 | Chopinet et al. ............. 501/69 |
| 6,736,352 B2 | * | 5/2004 | Bladt et al. ............. 244/129.3 |
| 6,786,453 B2 | * | 9/2004 | Jones ...................... 244/129.3 |
| 6,889,938 B1 | | 5/2005 | Nordman |
| 6,905,094 B2 | * | 6/2005 | Dazet et al. ............. 244/129.3 |
| 2006/0284016 A1 | * | 12/2006 | Balsillie et al. .......... 244/129.3 |

FOREIGN PATENT DOCUMENTS

EP    1478106    11/2004

OTHER PUBLICATIONS

U.S. Appl. No. 11/143,287, Sealed Structural Passenger Window Assembly and Method of Forming Same, Chris H. Balsillie, Donald P. Matheson, Jeffrey P. Sandys and Shawn M. Pare, 33 pages.

* cited by examiner

*Primary Examiner*—Tien Dinh
*Assistant Examiner*—Philip J Bonzell
(74) *Attorney, Agent, or Firm*—Rozenblat IP LLC

(57) ABSTRACT

A window assembly and method for its installation is provided. The window assembly may include multiple transparent panels covering an opening of an aircraft fuselage. One or more retainer members and a flexible clip member may be utilized to secure the window assembly over the opening of the fuselage.

19 Claims, 6 Drawing Sheets

WINDOW ASSEMBLY RETAINING SYSTEM

BACKGROUND OF THE INVENTION

Most current passenger aircraft window systems comprise multiple panes of acrylic that are coupled together in a multi-piece sheet metal attachment structure. Typically, this structure is installed from the interior of the aircraft and is not maintenance friendly since the passenger seats and aircraft interior wall fascia panels must be removed for access to the window system. Often, the window systems require a deep envelope in the fuselage to accommodate the bulky sheet metal structure holding the multi-pane window.

Many next generation aircraft incorporate transparent structural panels fastened around apertures in the fuselage skin to allow occupants of the aircraft to look through the transparent panels. The panels are typically attached directly to the inside of the fuselage skin. These panels often require external fairing panes to fill in the gap between the inside surface of the skin and the outside surface of the skin in order to provide an aerodynamically smooth surface on the outside surface of the fuselage. The external fairing panes may provide for noise abatement, a thermal barrier, and an abrasion resistant barrier for the internally mounted transparent panel.

The fairing pane attachment system for these next generation aircraft typically must fit inside an envelope equal to the thickness of the fuselage skin, and be capable of allowing installation of the fairing pane from the outside surface of the aircraft fuselage for quick replacement and easy maintenance. Conventional solutions for attaching the outer protective fairing pane have typically been to utilize a picture frame to encase the fairing pane, and fasteners for attachment to the aircraft structure. However, utilizing a picture frame, which generally comprises a raised step around the fairing pane aperture, may not supply a smooth aerodynamic surface on the exterior surface of the fuselage, and may induce drag and reduce performance. Moreover, attachment of fasteners is usually required. Installation of fasteners may be time consuming, may require torque specifications for proper attachment, and may require a maintenance person to remove gloves in order to perform necessary maintenance. Additionally, fasteners may be dropped during maintenance and may cause foreign object damage (FOD) to aircraft systems.

A window assembly and method for its installation is required which will allow for efficient installation of fairing panes from the outside of the aircraft fuselage in a space-challenged envelope. This window assembly may also be utilized in non-aircraft applications.

SUMMARY OF THE INVENTION

In one aspect of the present invention, a window assembly for an aircraft fuselage comprises a first transparent panel, a second transparent panel, a first retainer member defined by at least one hole, and a flexible clip member. The first transparent panel covers at least a portion of an opening in the aircraft fuselage. At least a portion of the flexible clip member extends into the hole.

In another aspect of the present invention, a window assembly for an aircraft fuselage comprises a first retainer member, a flexible clip member, and a first transparent panel. The first transparent panel is adapted to be fixedly secured in a location when a portion of the flexible clip member is in one of an extended position and a compressed position. Similarly, the first transparent panel is adapted to be released from the location when the portion of the flexible clip member is in the other of the extended position and the compressed position.

In a further aspect of the present invention, a method is provided for forming a window assembly on an aircraft fuselage having an opening. A first transparent panel is placed over at least a portion of the opening. A first retainer member is placed over at least a portion of the first transparent panel. The configuration of the flexible clip member is changed to secure the second transparent panel in a position.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
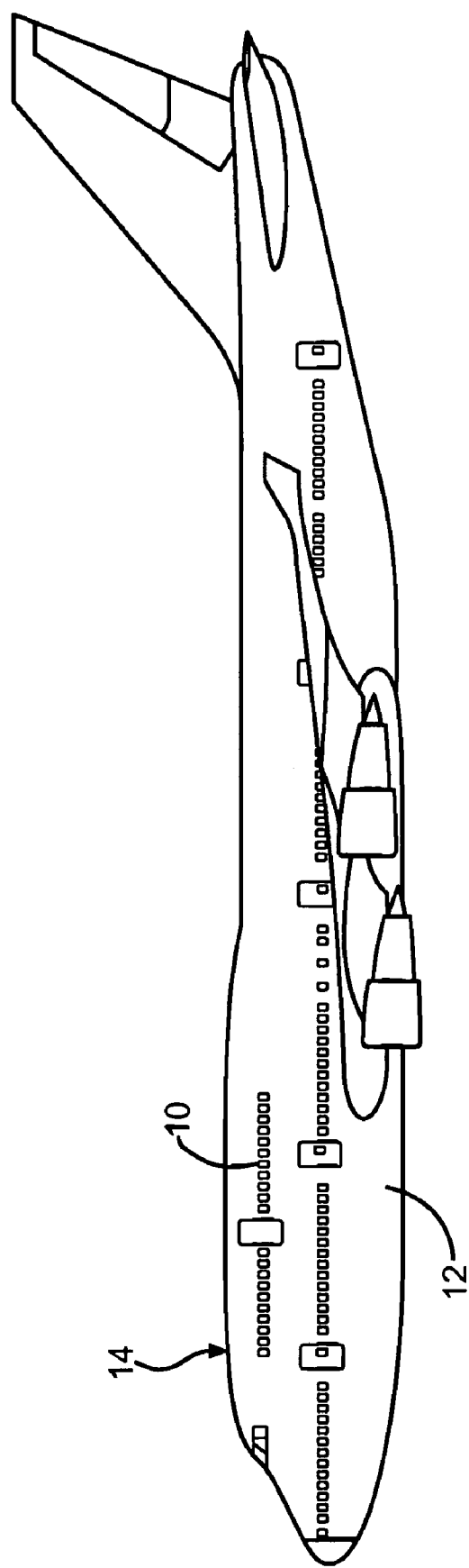
FIG. 1 is a perspective view of an aircraft incorporating a window assembly in accordance with the present invention.

Referring to FIG. 1, a plurality of window assemblies 10, in accordance with a preferred embodiment of the present invention, are illustrated as incorporated into a fuselage 12 of an airplane 14. The structural and operational properties of the window assembly 10 are especially well suited for use with aircraft, where the window assembly 10 is exposed to significant changes in thermal conditions and air pressure, as well as impacts from foreign objects. In other embodiments, the window assembly 10 may be implemented in non-aircraft applications, such as buses, trains, and ships.

Figure 2:
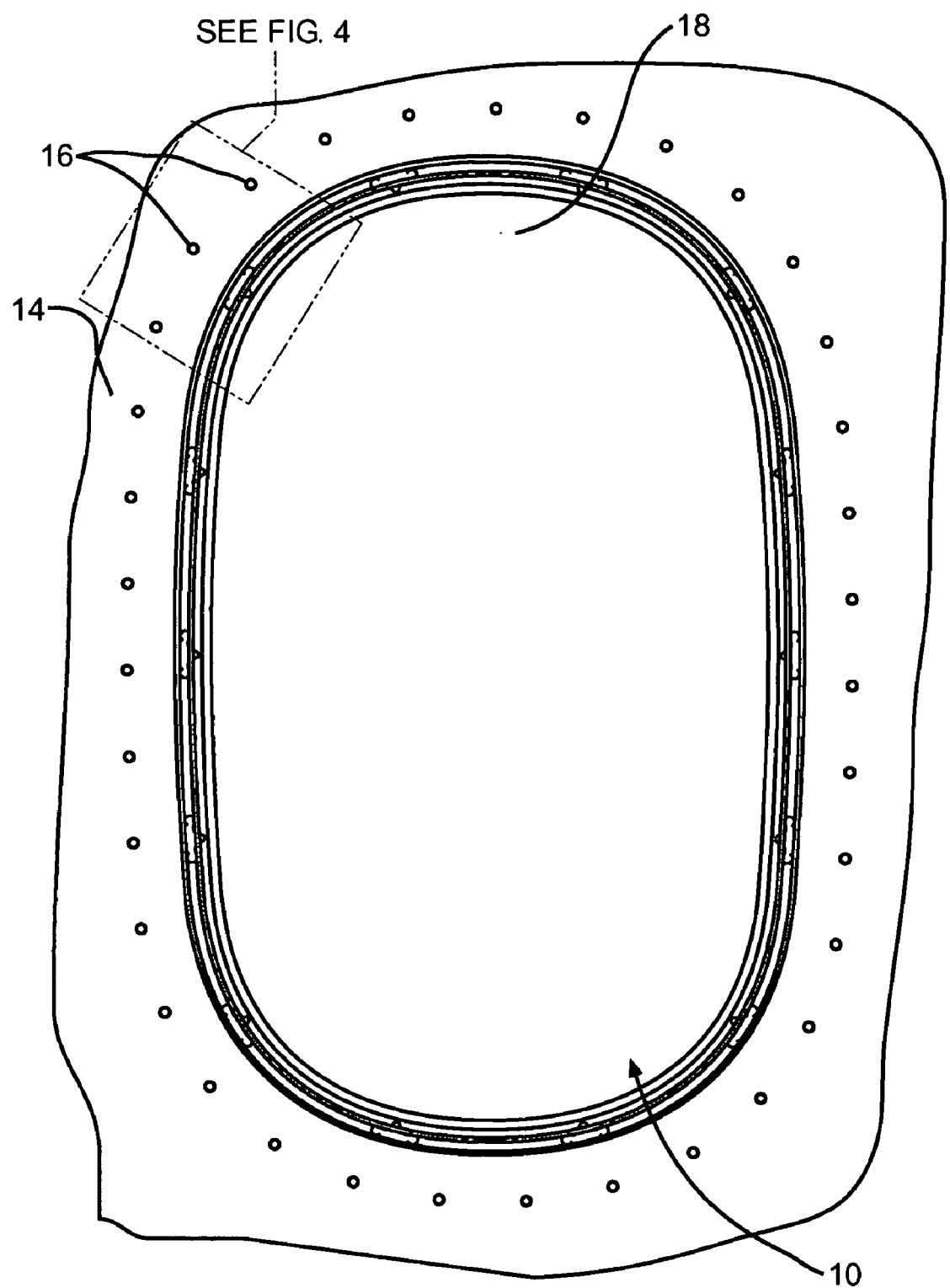
FIG. 2 is an enlarged plan view of one of the windows of the aircraft of FIG. 1.

FIG. 2 depicts an enlarged view of one of the window assemblies 10. The window assembly 10 is held to the fuselage 14 by a plurality of fastening elements 16 spaced circumferentially around an opening 18 in which the window assembly 10 is installed. The fastening elements 16 extend through pre-formed openings in the fuselage 14.

Figure 3:
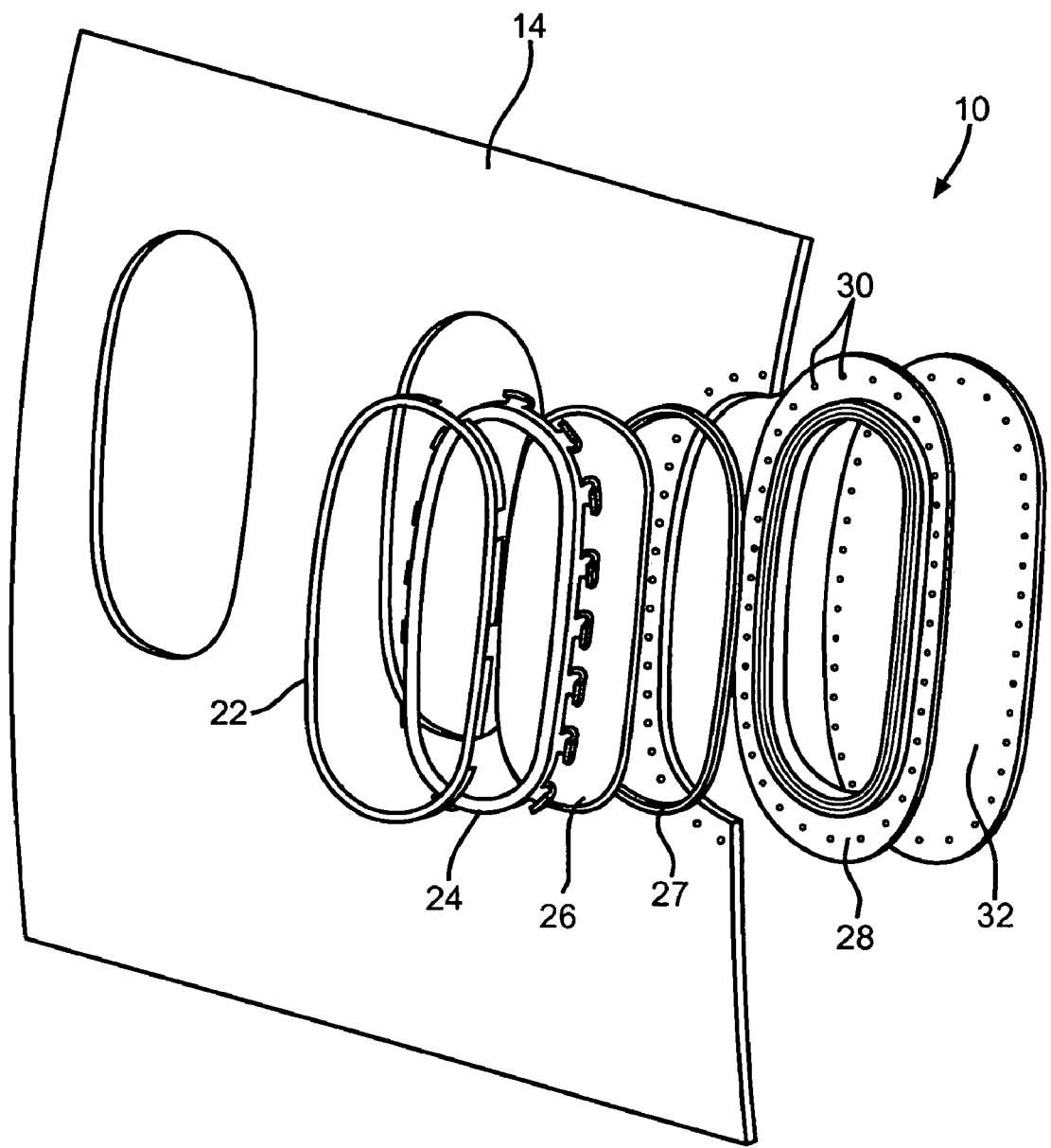
FIG. 3 is an exploded perspective view of the window assembly shown in FIG. 2.

FIG. 3 shows an exploded perspective view of the principal components of the window assembly 10. The outer seal 22 is aerodynamic and helps to prevent foreign material and liquid from penetrating the window assembly 10. The outer seal 22 is made of neoprene, but in other embodiments may be made of other sealing material known in the art such as silicone. The retaining frame 24, also referred to as a retainer member, encases the periphery of the fairing pane 26. Preferably, the retaining frame 24 is made of stainless steel, but in other embodiments may comprise any type of steel or plastic known to those of ordinary skill in the art. The fairing pane 26, also referred to as a transparent panel, is preferably glass, but in other embodiments, may comprise any transparent material known in the art. The retaining frame 24, fairing pane 26, and silicone seal 27 are disposed over a machined, annular, retaining fitting 28, also referred to as a retainer member. The retaining fitting 28 is made of a metallic such as aluminum, but in other embodiments may be made of any material known in the art. Holes 30 surround the retaining fitting 28 for bolting the retaining fitting 28 and the internal transparent panel 32 to the airplane's fuselage 14. The internal transparent panel 32 is preferably a composite, but in other embodiments may comprise any transparent material known in the art.

Figure 4:
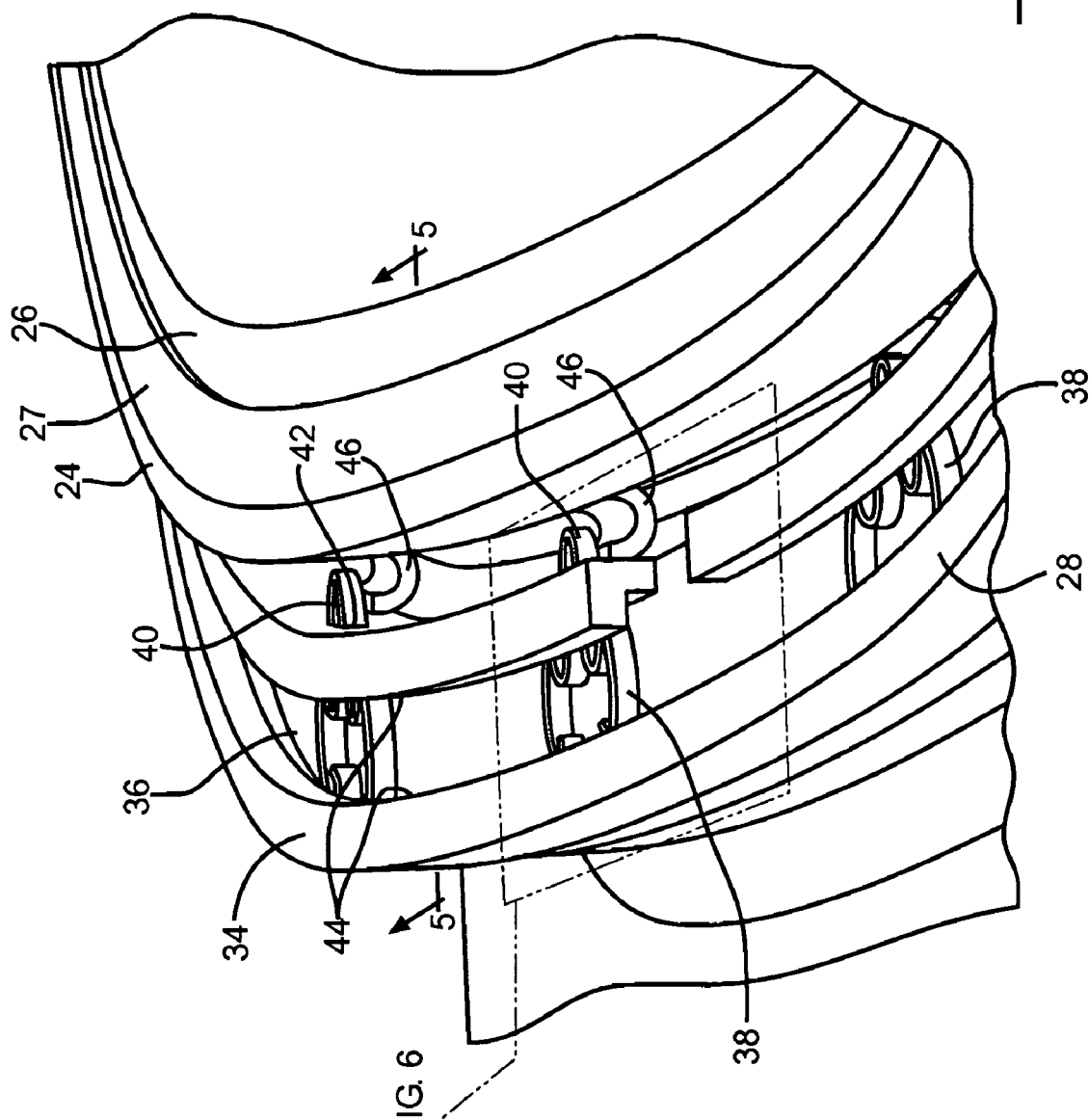
FIG. 4 is a perspective view of the dotted line area of FIG. 2 showing a retaining frame and fairing pane being installed utilizing a retaining fitting.
Figure 5:
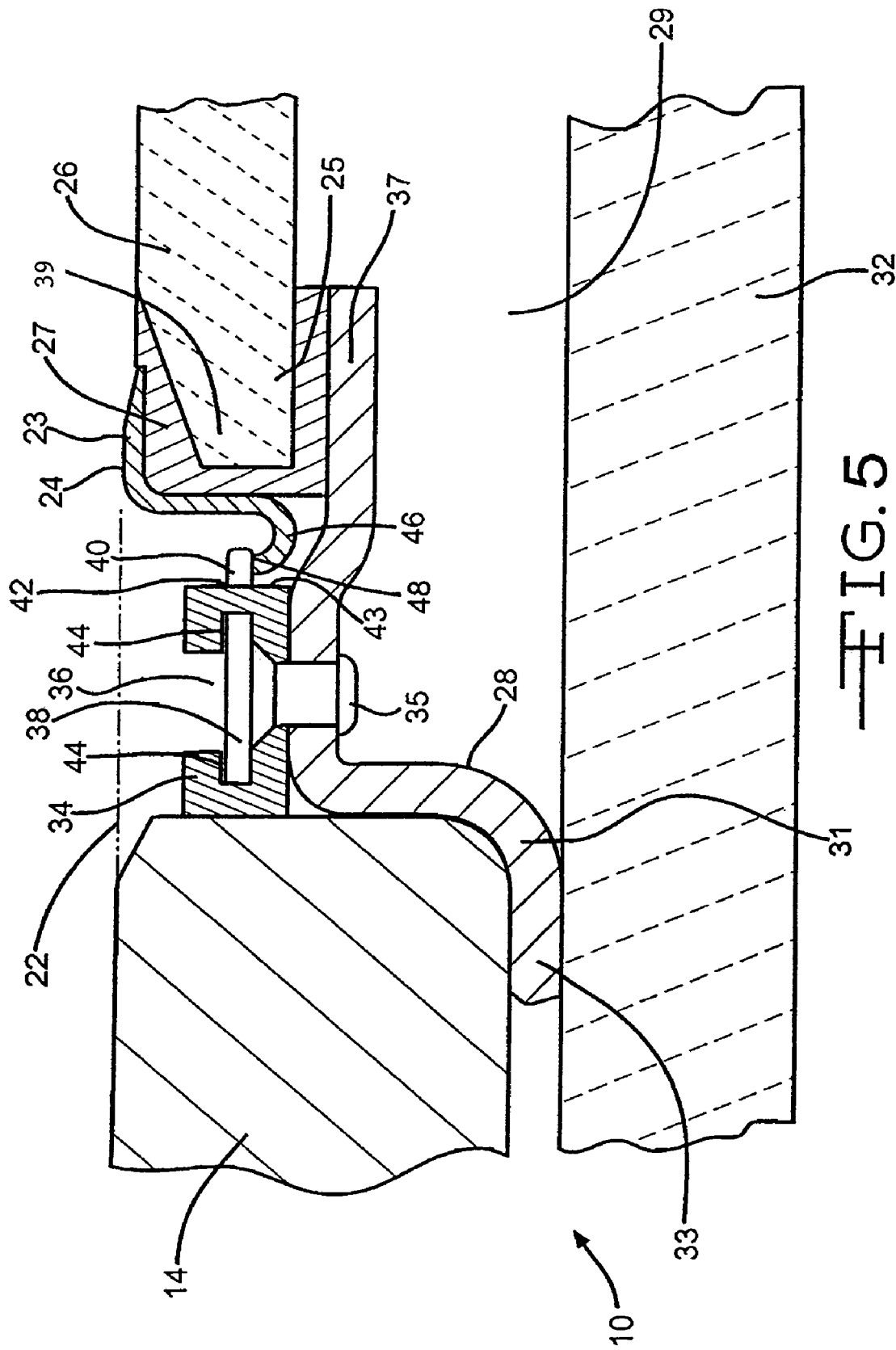
FIG. 5 is a partial cross-sectional view along lines 5-5 of FIG. 4.

FIGS. 4 and 5 illustrate the connection of the fuselage 14, outer seal 22, retaining frame 24, fairing pane 26, silicone seal 27, retaining fitting 28, and transparent panel 32. FIG. 4 is a perspective view of the dotted line area of FIG. 2 showing the retaining frame 24 and fairing pane 26 being installed utilizing the retaining fitting 28. FIG. 5 is a partial cross-sectional view along lines 5-5 of FIG. 4. The outer seal 22 provides access to the window assembly 10 when removed from the fuselage 14. As shown, a portion 33 of the retaining fitting 28 is fixedly disposed between the fuselage 14 and transparent panel 32. The retaining fitting 28 comprises a curved surface 31 and a boss member 34. The boss member 34 is attached to the curved surface 31 utilizing Titanium rivets 35. An internal, T-slot trough 36 defines the boss member 34. In other embodiments, the boss member 34 may be attached to the curved surface 31 utilizing any mechanism known in the art, or the curved surface 31 and boss member 34 may comprise an integral piece. In additional embodiments, the retaining fitting 28 may comprise a plurality of boss members 34, each defined by troughs 36. In still other embodiments, the trough 36 may be in any configuration.

The curved surface 31 of the retaining fitting 28 extends into a pressure-sealed cavity 29 in the fuselage 14. A portion 25 of the fairing pane 26 is disposed over a linear portion 37 of the retaining fitting 28. The silicone seal 27 is disposed between a portion 25 of the fairing pane 26 and the linear portion 37 of the retaining fitting 28. A portion 23 of the retaining frame 24 is disposed over the silicone seal 27 and fairing pane 26. Intermittent curved tabs 46 extend around the periphery of the retaining frame 24. A plurality of stainless steel, flexible, serpentine, wire, spring clips 38 are disposed intermittently inside the trough 36 around the perimeter of the retaining fitting 28. Preferably, twelve to fourteen flexible spring clips 38 are utilized, but in other embodiments, a varying number of clips made of varying materials may be utilized. A curved portion 40 of each flexible clip 38 is extended through a corresponding hole 42 in boss member 34 to allow the curved portion 40 of the flexible clip 38 to protrude past boss surface 43. Surfaces 44 within the T-slot trough 36 of the boss member 34 retain the flexible clips 38 in place within the trough 36. An end 48 of each curved tab 46 abuts against the extended portion 40 of the corresponding flexible clip 38. When the window assembly 10 is aligned in this configuration, the fairing pane 26 is secured in place with respect to the airplane's fuselage 14 due to the retaining frame 24 being fixed in place as a result of its abutment against the flexible clips 38. The use of multiple independent flexible clips 38 provides for a means of redundant retention to accommodate for the possibility that a clip 38 is not properly installed or fails in service. The shape of the clips 38 allows the clips 38 to act in double shear to reduce shear loads on each clip 38.

Figure 7:
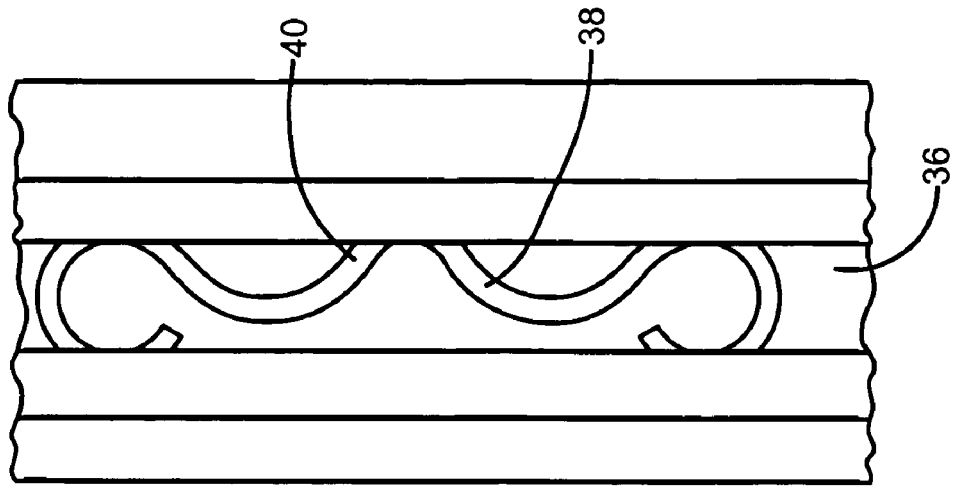
FIG. 7 is a top view of the clip member of FIG. 6 showing the configuration of the clip member in a compressed position.
Figure 6:
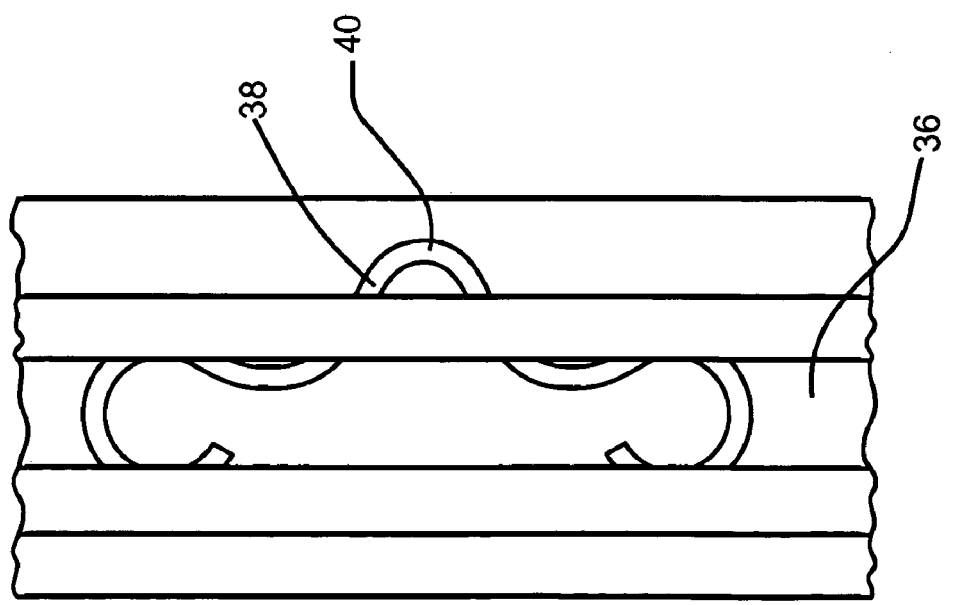
FIG. 6 is a top view of the clip member in the dotted line area of FIG. 4 showing the configuration of the clip member in an extended position.

During installation of the window assembly 10, the transparent panel 32 is placed over an opening of the aircraft fuselage 14. Preferably, the transparent panel 32 is placed inside of the aircraft fuselage 14, but in other embodiments, varying configurations may be used. The retaining fitting 28 is located over at least a portion of the transparent panel 32 and secured in place against the fuselage 14. Next, the fairing pane 26 is placed over at least a portion of the retaining fitting 28. Preferably, the portion 37 of the retaining fitting 28 over which the fairing pane 26 is placed is linear. The retaining frame 24 is placed over at least a portion 39 of the fairing pane 26. Preferably, a seal 27 is utilized between the retaining frame 24 and fairing pane 26. One or more flexible clips 38 are slid into one or more T-slot troughs 36 of one or more boss members 34 of the retaining fitting 28. The curved portion 40 of the flexible clip 38 is extended through a corresponding hole 42 in the boss member 34 to allow the curved portion 40 of the flexible clip 38 to protrude past boss surface 43 as shown in FIG. 6. The flexible clip 38 may also be inserted into the trough 36 before the window assembly 10 is installed in the aircraft. An end 48 of the curved tab 46 is downwardly abutted against an extended portion 40 of the flexible clip 38 to force the extended portion 40 of the flexible clip 38 to compress towards the hole 42. In such manner, the configuration of the flexible clip 38 is changed into the position depicted by FIG. 7. Once the end 48 of the curved tab 46 is fully past the flexible clip 38, the portion 40 of the flexible clip 38 re-extends away from the hole 42 to put the flexible clip back in the configuration shown in FIG. 6. In such manner, the end 48 of the curved tab 46 of the retaining frame 24 is abutted against the extended portion 40 of the flexible clip 38 preventing the retaining frame 24 from moving upwardly. As a result, the retaining frame 24, and hence the fairing pane 26, are locked in place.

To remove the fairing pane 26, the outer seal 22 is removed from the aircraft. A tool, such as a flat blade or the tip of a screwdriver, is inserted into the T-slot trough 36 against a surface of the flexible clip 38. The tool is used to force the flexible clip 38 to slide along the trough 36 to locate the flexible clip 38 back into the configuration shown in FIG. 7, thereby compressing the extended portion 40 of the flexible clip 38 towards the hole 42. When the extended portion 40 of the flexible clip 38 is compressed, the retaining frame 24 may be removed allowing access to the fairing pane 26. In such manner, the fairing pane 26 may be removed without disassembling the entire window. A new fairing pane 26 may be installed by replacing the silicone seal 27, and sliding the flexible clip 38 back into its engaged position so that the extended portion 40 of the flexible clip 38 is re-extended away from the hole 42 back into its configuration of FIG. 6.

In other embodiments, one or more flexible clips 38 may be utilized in a variety of configurations and locations, utilizing differing expansion and compression mechanisms for various portions of the flexible clips 38, to secure and un-secure a variety of parts of the window assembly. In still other embodiments, differing configurations, locations, assembly mechanisms, and expansion and compression mechanisms may be used for the various parts of the present invention.

The invention may allow for a fairing pane 26 to be installed or replaced without the use of fasteners, and without the use of costly tools. As a result, the invention may allow for more time effective, efficient, and less costly installation and maintenance of window assemblies.

It should be understood, of course, that the foregoing relates to exemplary embodiments of the invention and that modifications may be made without departing from the spirit and scope of the invention as set forth in the following claims.

I claim:

1. A window assembly of an aircraft fuselage comprising:
a first transparent panel disposed adjacent to an opening in the aircraft fuselage;
a second transparent panel disposed within the opening of the aircraft fuselage;
a first retainer member having a trough and a plurality of holes extending through a surface of the first retainer member into the trough;
a second retainer member having a plurality of tabs; and
a plurality of disconnected flexible clip members disposed in the trough of the first retainer member, wherein each flexible clip member has an extended position in which the flexible clip member is disposed in the trough and a portion of the flexible clip member extends through one of the holes against one of the tabs so that the second retainer member locks the second transparent panel in place within the opening, and each flexible clip member has a retracted position in which the flexible clip member is disposed in the trough and the portion of the flexible clip member is flexibly retracted apart from the one tab into the one hole to allow the second retainer member and the second transparent panel to be removed from the opening from outside the aircraft fuselage.

2. The window assembly of claim 1, wherein at least one of said first and second transparent panels is made of one of glass and a composite.

3. The window assembly of claim 1, wherein at least a portion of said first retainer member is disposed between said first transparent panel and an outer surface of said aircraft fuselage.

4. The window assembly of claim 1, wherein said first retainer member is bolted to said aircraft fuselage.

5. The window assembly of claim 1, wherein said first retainer member extends around said opening.

6. The window assembly of claim 1, wherein said flexible clip members comprise spring clips intermittently disposed within the trough around a perimeter of the first retainer member, each flexible clip member when in the retracted position being separately slideably disposed within the trough of the first retainer member to allow each flexible clip member to slide within the trough relative to the other flexible clip members.

7. The window assembly of claim 1, wherein the tabs are disposed around a perimeter of the second retainer member.

8. The window assembly of claim 1 wherein the flexible clip members are adapted to lock and unlock the second transparent panel within the opening without the use of fasteners.

9. The window assembly of claim 1, wherein said first retainer member comprises at least one boss member attached to a curved portion of the first retainer member, wherein said trough and said plurality of holes are disposed in said boss member.

10. The window assembly of claim 9, wherein said at least one boss member is riveted to said curved portion of the first retainer member.

11. The window assembly of claim 9, wherein a part of said curved portion is disposed between said first transparent panel and said aircraft fuselage.

12. A method for forming an aerodynamic window assembly on an aircraft fuselage having an opening comprising:
placing a first transparent panel adjacent to at least a portion of said opening;
placing a first retainer member over at least a portion of said first transparent panel;
placing a second transparent panel over at least a portion of said first retainer member;
placing a second retainer member over at least a portion of said second transparent panel;
slideably disposing a plurality of disconnected flexible clip members within a trough of said first retainer member; and
extending a portion of each flexible clip member through a respective opening of said first retainer member against a respective tab of said second retainer member so that the second retainer member locks the second transparent panel in place within the opening.

13. The method of claim 12 further comprising bolting the first retainer member to the aircraft fuselage.

14. The method of claim 12 wherein the slideably disposing comprises separately slideably disposing the plurality of disconnected flexible clip members within the trough around a perimeter of the first retainer member to dispose the disconnected flexible clip members intermittently around the second transparent panel.

15. The method of claim 12 wherein the slideably disposing comprises contacting each flexible clip member with a tool to slide each flexible clip member within the trough.

16. The method of claim 12 further comprising retracting the portion of each flexible clip member into the respective opening of said first retainer member and apart from said respective tab of said second retainer member to unlock the second transparent panel from the opening.

17. The method of claim 16 further comprising removing the unlocked second transparent panel from the opening.

18. The method of claim 16 wherein the locking and unlocking of the second transparent panel is done without the use of fasteners and from outside the aircraft fuselage.

19. The method of claim 16 wherein the retracting comprises contacting each flexible clip member with a tool to retract the portion of each flexible clip member into the respective opening of said first retainer member and apart from said respective tab of said second retainer member.

\* \* \* \* \*

UNITED STATES PATENT AND TRADEMARK OFFICE
CERTIFICATE OF CORRECTION

PATENT NO. : 7,661,626 B2
APPLICATION NO. : 11/262361
DATED : February 16, 2010
INVENTOR(S) : Jeffrey H. Wood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 530 days.

Signed and Sealed this

Thirtieth Day of November, 2010

David J. Kappos
*Director of the United States Patent and Trademark Office*